Patented Oct. 1, 1935

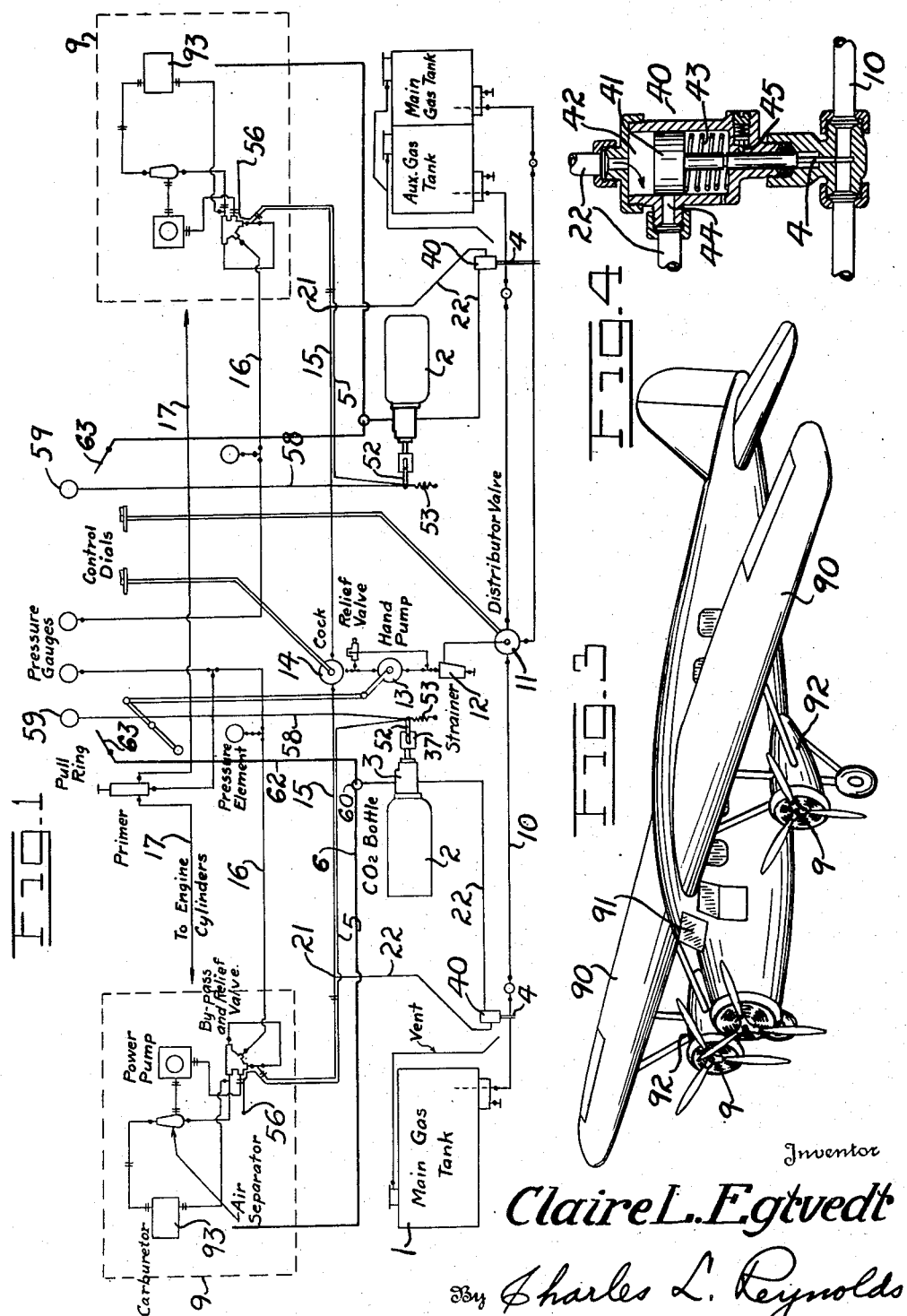

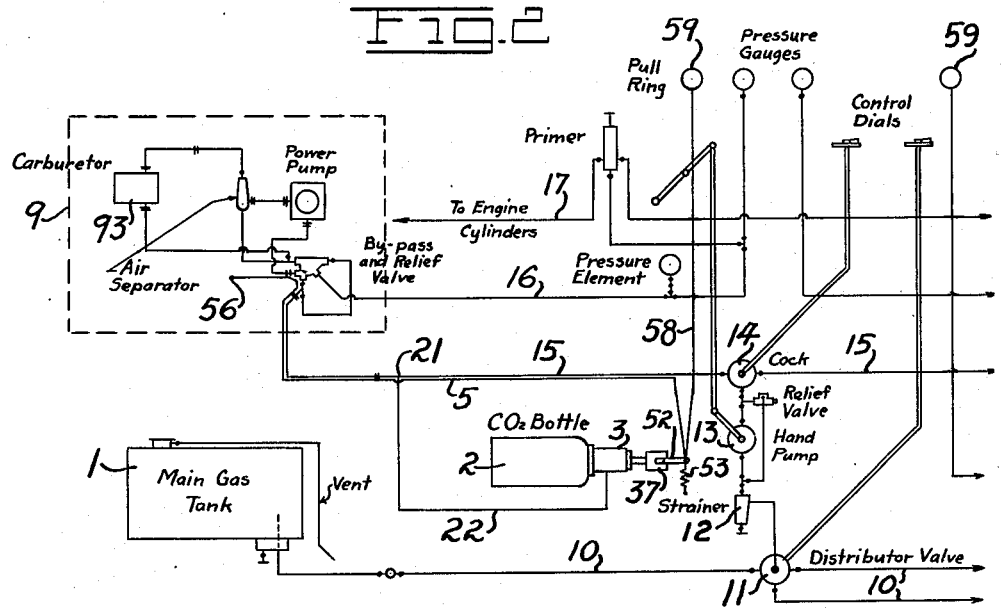
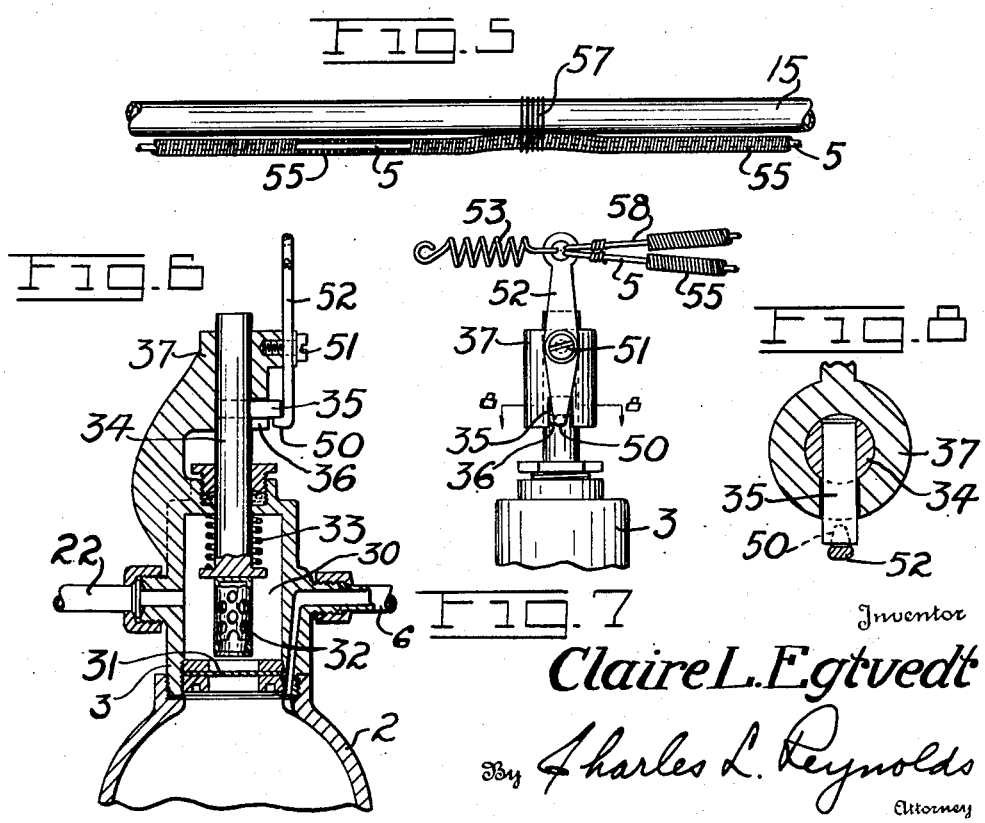

2,015,995

UNITED STATES PATENT OFFICE 2,015,995

FIRE PREVENTING AND EXTINGUISHING SYSTEM FOR AIRCRAFT

Claire L. Egtvedt, Seattle, Wash., assignor to Boeing Airplane Company, Seattle, Wash., a corporation of Washington Application January 13, 1934, Serial No. 706,521

25 Claims. (Cl. 169—2)

Fires following the crash of an airplane are frequently the cause of loss of life, where otherwise the occupants would be injured but slightly. In crashes the engine may be thrown from the plane, or if it is carried in a nacelle, the entire nacelle may be separated from the plane, or if the engine is carried on the wing, the wing may be sheared off by contact with an obstruction, such as a tree, and in that way the engine is separated from the control cabin. Generally one or more fuel-filled tubes extend from the control cabin to such an engine, and the breaking of such a tube, especially if it be a fuel supply tube or a like tube connected with the supply tank, or even the straining of such a tube, ruptures the tube itself or some connection in the line, and gasoline or other fuel is thus permitted to run out at the rupture. The gasoline thus discharged may fall on a hot exhaust pipe, igniting the plane and thus possibly leading to an explosion of the gasoline tank, or it may be otherwise ignited. Similar conditions are found in the crash of other automotive vehicles, for instance automobiles.

In this specification I shall use the term "fuel-filled tube" to describe generically any tube or conduit wherein is or may be found gasoline or other fuel. Different fuel systems vary, and in some installations separate relief or return tubes are provided for the power pump, generally located adjacent the engine, and the hand pump, respectively, the latter being generally located adjacent the control cabin. Such an installation is illustrated herein. In other systems the excess from the power pump is returned to the inlet side of the hand pump, and in such systems this return tube constitutes a fuel-filled tube which is liable to rupture, and which is susceptible to protection by my invention. The same holds true for pressure gauge lines, primer lines, and all other conduits which may be filled with fuel. Furthermore, since it is not uncommon to employ various fire-extinguishing fluids or substances (for instance powders), the term or "fire-extinguishing fluid," as used herein, shall be understood to embrace any suitable substance, which can be discharged from a conduit or container, though for reasons which will appear hereafter liquid carbon dioxide, or a like substance which is extremely cold, and which has an inherently high pressure, is preferred. When the term "carbon dioxide" is employed it shall be understood as used purely as illustrative of any suitable fire-extinguishing fluid, as that term is herein defined.

It is a general object of this invention to provide automatic means whereby the rupturing, that is a violent breaking and parting of such a fuel-filled tube will effect the release of a fire-extinguishing fluid, such as liquid carbon dioxide, in the vicinity of the rupture, and preferably this is discharged directly into the fuel-filled tube, whereby it discharges through the rupture, and also forces its way back into the fuel tank; this in turn accomplishes three objects—first, the smothering or prevention of incipient flames, second, the cooling of hot surfaces with which it may come into contact, and which might also be contacted by the leaking fuel, to the end both of preventing and extinguishing fires and of removing one of the frequent sources of ignition, and the third object, which is dealt with in the next paragraph.

It is a further object, by the employment of liquid carbon dioxide or a like substance which has inherently a high pressure, to discharge the same automatically, in the event of a crash, into the fuel system, whereby the high pressure serves to hold back the gasoline or other liquid fuel, and to prevent its further discharge from the source of supply, and in addition, if the lines are cleared, to fill them and to supplant the inflammable atmosphere in the fuel tanks with a non-inflammable atmosphere.

Since the carbon dioxide will, in a comparatively short time, dissipate itself, and though by this time the plane is probably at rest upon the ground and the danger of its catching fire is materially lessened, it is desirable to shut off the supply of gasoline to the tubes so that it cannot continue to leak out, and to that end it is a further object of the invention to provide a valve disposed in the main fuel supply tube (or in any or all of the fuel-filled tubes) which will be automatically closed upon rupture of the line, and this may be done by the pressure of the carbon dioxide as it is discharged from the bottle, and may be done prior to the discharge of the carbon dioxide into the ruptured tube.

While the rupture of such a tube would normally occur by reason of a pull on the line, and while this pull may be translated into a discharge of the fire-extinguishing fluid, yet there may be some crashes where the fuel-filled tube is sheered off without producing any pull, and for such occasions it is a further object to provide operating mechanism which will function either with a pull, or upon such a shearing action, to accomplish discharge of the carbon dioxide.

It is a further object to provide a system of this sort which will be light and yet reliable, and not likely to be rendered operative by the normal shocks and vibration occurring during operation of the aircraft.

With the above objects and others which will be ascertained as this description progresses, my invention comprises the novel system as a whole, and the novel combination, both of the parts thereof and of the system with the fuel supply system of an automotive vehicle, all as shown in the accompanying drawings and as will be described and claimed hereinafter.

The accompanying drawings show my system diagrammatically in different forms, and illustrate various mechanical devices which may be employed in conjunction therewith, though my invention resides broadly in the system, regardless of the mechanical devices or particular substances employed, as well as in the more specific forms and combinations of such devices.

Figure 1 is a diagrammatic showing of the complete fuel system and fire extinguishing system for a dual-motored plane, whereon the two engines are mounted each outwardly of the fuselage, wherein are mounted the controls, gauges, etc.

Figure 2 is a similar diagram, illustrating the controls and a single engine only, with a slightly modified fire extinguishing system.

Figure 3 is a view of such an airplane as would be supplied with a fuel system of the type shown in Figures 1 and 2.

Figure 4 is an axial sectional view of a closure valve such as may be included in the fire-extinguishing system of Figure 1.

Figure 5 is an elevation, with parts broken away, of an actuating device such as would be found suitable in my fire-extinguishing system.

Figure 6 is a sectional view of the $CO_2$ bottle and the discharge mechanism therefor, and Figure 7 is an elevation, taken at right angles to Figure 6, of the detent and discharge mechanism.

Figure 8 is a transverse section on the line 8—8 of Figure 7.

The airplane shown in Figure 3 is typical of many planes which mount the motors 9 each in a nacelle 92 on or below the wings 90 outwardly of the control cabin 91. In this particular plane the main gasoline tanks are carried (as is also an auxiliary supply tank) in the wing between the engine or its nacelle 92 and the control cabin 91. By reference to Figure 1 it is seen that the main gas tank 1 is connected to the motor, represented in general by the dash line rectangle 9, and which has associated with it the carburetor 93, by a system of tubing which includes a main supply tube 10, a distributor valve 11, a strainer 12, a hand pump 13, a cock 14 controlling distribution to the two outboard motors, and a fuel feed tube 15, all of which are mounted within or lead to or from the fuselage. At the engine are located such elements as an air separator, power pump, and by-pass and relief valve, with appropriate connections. As I have pointed out, the particular elements of such a system, and their arrangement in the system, is subject to variation, and my invention is concerned principally with the fuel-filled tubes, especially such as extend from the control cabin outwardly to a distant engine, without regard to the elements of or the system as a whole. In addition to the tubes mentioned, a pressure line 16 to suitable pressure gauges extends from the engine back inwardly to the control cabin, and a primer line 17 also extends from the control cabin outwardly to the engine.

In a crash where a wing strikes an obstruction such as a tree the engine 9 may be thrown away from the nacelle, or the nacelle itself may be separated from the plane, especially in installations wherein it is not built into the wing, and any such separation of the engine naturally ruptures the feed line 15 and as well the lines 16 and 17. In all such cases it is likely that the rupture will occur adjacent the engine or nacelle, and in any event a point can be selected in the feed line 15 or any other line which is likely to be inwardly of the rupture, that it, toward the control cabin or fuel tank from the rupture, and at this point 21 is connected a conduit, which may be an ordinary piece of tubing, indicated at 22, this extending from a discharge device 3 secured upon a $CO_2$ bottle 2 filled with liquid carbon dioxide.

Intermediate the discharge device 3 and the connection 21 to the feed tube 15 may be interposed a valve 4 in the main supply line 10, this valve 4 being normally open but being supplied with a device, generally indicated at 40, whereby the pressure of the carbon dioxide, passing out through the tube 22, will first force the valve 4 closed, before it can continue on to the connection at 21. Such valves are employed in emergency flotation gears, and a typical valve of this sort is shown in Figure 4, wherein the valve 4 is connected to a piston 41 within a cylinder 42, and is held open by a light spring 43. Carbon dioxide, when released, enters above the piston 41 and depresses it in opposition to the spring 43, closing the valve 4 in the feed line 10, and passing out through the port 44 to the connection at 21. The pressure serves to keep the valve closed, and a spring detent 45 engages a groove in the stem of the piston to retain the valve closed, so that the line 10 will not be opened again when the pressure of the carbon dioxide is exhausted.

The release device 3 for the carbon dioxide is similarly a device which has been employed in releasing carbon dioxide for the inflation of emergency flotation gears, although any suitable device for the purpose may be employed. As shown in Figure 6, the casing 3 defines a chamber 30 which is normally sealed by a diaphragm 31, preventing discharge of the liquid carbon dioxide from within the bottle 2 into the connected chamber 3, and thence through the discharge conduit 22. A perforated tube 32 is urged in a direction and with sufficient force to puncture the diaphragm 31 by a spring 33, but is normally held against the action of the spring 33 by a detent 50 pivoted at 51 and engaging a lug or pin 35 on the stem 34 of the plunger. To prevent accidental disengagement of the detent 50 from the pin 35 the latter is guided in a slot 36 in a head 37.

The detent should be arranged to disengage the pin 35 either upon a pull, which is the normal way in which rupture of the line 15 occurs or by a slacking of the line, such as would occur were it sheared off, and to this end I connect a suitable device such as a Bowden wire 5 to the arm 52 of the detent, and give the wire sufficient tension that it tends to throw the detent to one side, out of engagement with the pin, and this tension is balanced by a compensating spring 53. This Bowden wire, then, with its sheath 55, may extend from the detent to the tube 15, and thence along the tube from within the control cabin to the engine, where at a point indicated in Figures 1 and 2 at 56 the end of the wire is suitably secured, for instance to the engine itself. The sheath, in order that it may not be moved if the wire is pulled, is preferably secured at intervals to the tube 15, as indicated by the wrapping at 57 (see Figure 5).

In order that the device may be manually operated at will, for instance if the pilot sees that a crash is inevitable, a duplicate wire 58 is provided, secured to the arm 52 carrying the detent and extending within the control cabin to a suitable pull ring 59.

As will now be evident, any separation of the engine or its nacelle from the airplane proper will cause a pull initiating at the point 56 upon the wire 5, which will overcome the tension of the spring 53 and throw the detent 50 out of engagement with the pin 35, releasing the shell 32 and puncturing the diaphragm 31, whereupon the liquid carbon dioxide escapes and discharges through and into the conduit 22. In the form shown in Figure 1 it first closes the valve 4, preventing further delivery of gasoline from the gas tank, and then discharges into the tube 15. Its pressure is extremely high, and this in itself will force back any residue of gas in the tube 15 and in the connections leading up to it, and in addition the carbon dioxide will discharge through the rupture, which would be at a point outwardly of the connection at 21, the point 21 having been chosen inward of (that is, towards the control cabin from) the probable point of accidental rupture in the tube 15. The carbon dioxide in itself will serve to extinguish and prevent ignition of the gasoline, and if there is a tendency for fire to be started by gasoline falling upon a hot exhaust pipe, it is evident that the carbon dioxide discharging through the rupture will fall on the same exhaust pipe, and because of its very low temperature will cool the exhaust pipe to a point where it is less likely to ignite the gasoline, should a small amount strike the hot exhaust pipe. If the tube 15 and wire 5 are sheared off, the spring 53 will disengage the detent with the same results.

With the form shown in Figure 2, wherein the valve 4 is omitted, the carbon dioxide is discharged directly into the tube 15, and reliance is placed on the back pressure thus created in this tube to prevent discharge of gasoline through the rupture, at least until the plane has come to rest upon the ground, when the likelihood of fire is greatly reduced. The carbon dioxide, at high pressure, will tend to force all gasoline back through the lines, and will supplant the inflammable atmosphere of gasoline with a non-inflammable atmosphere of carbon dioxide, wherever the latter may reach.

Instead of the wire connection shown, paralleling the feed tube 15, any sutiable connection may be employed whereby the movement of the engine away from the airplane proper, or the shearing off of connections therebetween, will effect the removal of the detent and the discharge of the carbon dioxide.

I have described the system as one in which the carbon dioxide is discharged into the feed tube, since that connects more or less directly with the supply tank, but it is obvious that similar connections, from the same or from other $CO_2$ bottles might be made to the pressure lines 16 or the primer lines 17, if desired, or to any other fuel-filled tube.

It is customary in airplane construction to employ a $CO_2$ bottle capable of discharging carbon dioxide at will into the engine section or nacelle, in the vicinity of the carburetor, whereby, if fires occur in starting the engine, due to backfires or the like, or if fires occur in the engine section on the ground from any cause, the carbon dioxide thus released will extinguish the fire. It will be found convenient to employ the $CO_2$ bottle 2 as the source of such carbon dioxide in addition to its use in the emergency system just described. This may be conveniently done by connecting a bleeder line 6 to the botle inside of the diaphragm 31, this line being controlled by a valve 60, preferably at or close to the bottle, the line 6 extending to a point adjacent the carburetor or engine section which is to be protected, and there terminating in the space surrounding the carburetor, usually enclosed within a nacelle. A link 62 connects the handle of the valve 60 to an operating handle 63 in the pilot's control cabin, or a connection may be made to any convenient point, whereby when a ground fire starts, the valve 60 may be opened promptly and will discharge a sufficient amount of carbon dioxide to extinguish the fire. The valve 60 may then be closed, and normally the amount of $CO_2$ thus lost will not materially reduce the efficiency of the emergency system. Weight is thus conserved by using the one source of $CO_2$ for all the purposes for which it may be needed.

What I claim as my invention is:

1. In combination with a fuel supply system, a normally restrained source of fire-extinguishing fluid, and means operable by and upon violent breakage of an element of the fuel supply system to release such fluid into the vicinity of the break.

2. In combination with the fuel supply system of an automotive vehicle, and a fuel-filled tube therein, a source of fire-extinguishing fluid, means normally preventing its release, and means operable by and upon violent breakage of said tube to release such fluid through the break in the tube.

3. In an aircraft or like automotive vehicle, in combination with a fuel supply source, an engine, and a connecting fuel-filled tube, a normally restrained source of fire-extinguishing fluid, and means, including a member paralleling the tube operable by and upon violent breakage of said tube to release such fluid into the tube.

4. In an aircraft, in combination with a gasoline supply source and an engine distant therefrom, and a connecting fuel supply tube, a source of fire-extinguishing fluid, a conduit connecting the fluid source with the fuel supply tube, inwardly of a point of probable accidental rupture, means restraining the fluid, and means operable by violent breakage of said fuel supply tube to release the fluid, for discharge into the latter tube, and through the break therein.

5. In an aircraft having a nacelle-mounted engine and a fuel-filled tube leading thereto, a source of fire-extinguishing fluid, means normally restraining the fluid against release, a conduit connecting said source to said tube inwardly of the nacelle, and means operable by violent breakage of said tube to release the fluid for discharge into the tube.

6. In an aircraft having a nacelle-mounted engine and a fuel-filled tube leading thereto, a source of fire-extinguishing fluid, means normally restraining the fluid against release, a conduit connecting said source to said tube inwardly of the nacelle, and tension means secured to a point adjacent the engine, and operable upon separation of the nacelle or engine to release the fluid for discharge into the tube.

7. In an aircraft or like automotive vehicle, in combination with a fuel supply source, an engine, and a connecting fuel-filled tube, a source of fire-extinguishing fluid, a sheathed wire paralleling the tube, the sheath thereof being secured to the tube, and the wire being secured to a point adjacent the engine, and means operable by a pull on said wire to discharge the fluid into the tube.

8. In an aircraft or like automotive vehicle, in combination with a fuel supply source, an engine, and a connecting fuel-filled tube, a source of fire-extinguishing fluid, a sheathed wire paralleling the tube, the sheath thereof being secured to the tube, and the wire being secured to a point adjacent the engine, and means operable upon severance of said wire to discharge the fluid into the tube.

9. In combination with the fuel supply system of an automotive vehicle, and a fuel-filled tube therein, a source of fire-extinguishing fluid, means normally restraining the fluid against release, and means operable by and upon violent breakage of said tube to release such fluid through the break in the tube, and auxiliary manually operable means to thus release the fluid at will.

10. In an aircraft or like automotive vehicle, in combination with a fuel supply source, an engine, and a connecting fuel-filled tube, a source of fire-extinguishing fluid, a sheathed wire paralleling the tube, the sheath thereof being secured to the tube, and the wire being secured to a point adjacent the engine, means operable automatically to discharge the fluid into the tube, a detent normally restraining the latter means, and means operable either by a pull upon said wire or by slackening thereof to release the detent for operation of the automatic discharge means.

11. In an aircraft or like automotive vehicle, in combination with a fuel supply source, an engine, and a connecting fuel-filled tube, a source of fire-extinguishing fluid, a sheathed wire paralleling the tube, the sheath thereof being secured to the tube, and the wire being secured to a point adjacent the engine, means operable automatically to discharge the fluid into the tube, a detent normally restraining the latter means, a spring normally balancing the pull on the wire, and operable upon slackening of the wire to release the detent, and the wire being connected to the detent and operable upon further tensioning to release the detent, in either case to initiate operation of the automatic discharge means.

12. In an aircraft or like automotive vehicle, in combination with a fuel supply source, an engine, a fuel supply tube connecting the two, a source of fire-extinguishing fluid, a valve in the fuel supply tube normally open, and means operable by and upon violent breakage of said tube to close said valve and to discharge such fluid into said tube.

13. In an aircraft or like automotive vehicle, in combination with a fuel supply source, an engine, a fuel supply tube connecting the two, a source of fire-extinguishing fluid, a valve in the fuel supply tube normally open, and means operable by and upon violent breakage of said tube first to close said valve and thereafter to discharge such fluid into said tube at a point beyond the valve from the fuel supply source.

14. In an airplane including a wing, a control cabin, an engine mounted on the wing outwardly of the control cabin, and a fuel supply tube extending from the control cabin to the engine, in combination, a source of fire-extinguishing fluid, means normally restraining the fluid against release, a conduit connecting the source with the fuel supply tube inwardly of a point of probable accidental breakage, and means operable by and upon violent breakage of said tube to release such fluid for discharge into the tube and through the break.

15. The method of preventing fire following a crash of an airplane, which results in breakage of a fuel-filled tube, which consists in discharging a fire-extinguishing fluid under pressure into such tube, and thence to the atmosphere through such break.

16. The method of preventing fire following a crash of an airplane, which results in breakage of a fuel-filled tube, which consists in discharging into such tube a fire-extinguishing fluid at high pressure, utilizing such fluid to hold back the outflow of fuel, and emitting such fluid from the break in the tube.

17. The method of preventing fire following a crash of an airplane, which results in breakage of a fuel-filled tube, which consists in discharging liquid carbon dioxide or like fire-extinguishing fluid at very low temperature into the tube, emitting such fluid therefrom through the break, and cooling hot parts by contact of the fluid therewith.

18. In an airplane or like automotive vehicle, in combination with the engine, fuel supply source and a tube connecting them, a liquid $CO_2$ bottle, a means to release the same, a conduit leading from said bottle to said tube, a detent normally holding the release means in inoperative position, and a wire paralleling said tube and secured at one end to the detent and at its other end to the tube at a point adjacent the engine, and operable upon being pulled by separation of the engine from the airplane to release the detent.

19. In an airplane or like automotive vehicle, in combination with the engine, fuel supply source and a tube connecting them, a normally open valve in said tube and means to close the same, a liquid $CO_2$ bottle, a means to release the same, a conduit leading from said bottle to said tube, and including the valve-closing means, a detent normally holding the release means in inoperative position, and a wire paralleling said tube and secured at one end to the detent and at its other end to the tube at a point adjacent the engine, and operable upon being pulled by separation of the engine from the airplane to release the detent and to close said valve.

20. In an aircraft, in combination with an engine and a fuel supply system including a fuel supply source distant from the engine, a source of fire-extinguishing fluid, means normally restraining such fluid against release, and means operable by and upon violent breakage in the fuel supply system to release the fire-extinguishing fluid into the vicinity of the break.

21. In combination with a fuel-filled tube, a normally restrained source of fire-extinguishing fluid, and means operable automatically upon violent breakage of such tube to release such fluid into the tube, for discharge therethrough to the atmosphere in the vicinity of the break.

22. In combination with a fuel-filled tube connecting two devices spaced apart, a normally restrained source of fire-extinguishing fluid, means operable automatically by relative movement apart of said devices effected by violent breakage of the tube, to release such fluid to the atmosphere at the point of such break.

23. In combination with a fuel-filled tube, a tight container filled with fire-extinguishing fluid, means operable automatically by violent breakage of said tube to discharge such fluid from said container, in the vicinity of the break.

24. In combination with a fuel-filled tube, a tight container filled with fire-extinguishing fluid under pressure, a conduit connecting said container with the interior of said tube, and means automatically operable by violent breakage of said tube to establish communication between the interior of said container and said conduit, whereby to discharge the fluid into the tube and thence through the break.

25. In an aircraft or like automotive vehicle, in combination with a fuel supply source, an engine, and a connecting fluid-filled tube, a source of fire-extinguishing fluid, a sheathed wire paralleling the tube, the sheath thereof being secured to the tube at a plurality of spaced points throughout its length, and the wire being secured to a point adjacent to the engine, and means operable by a pull on said wire to discharge the fluid into the tube.

CLAIRE L. EGTVEDT.